July 20, 1965 J. R. SMITH, JR 3,196,362
TEMPERATURE COMPENSATED SOLID STATE DIFFERENTIAL AMPLIFIER
Filed Jan. 4, 1962
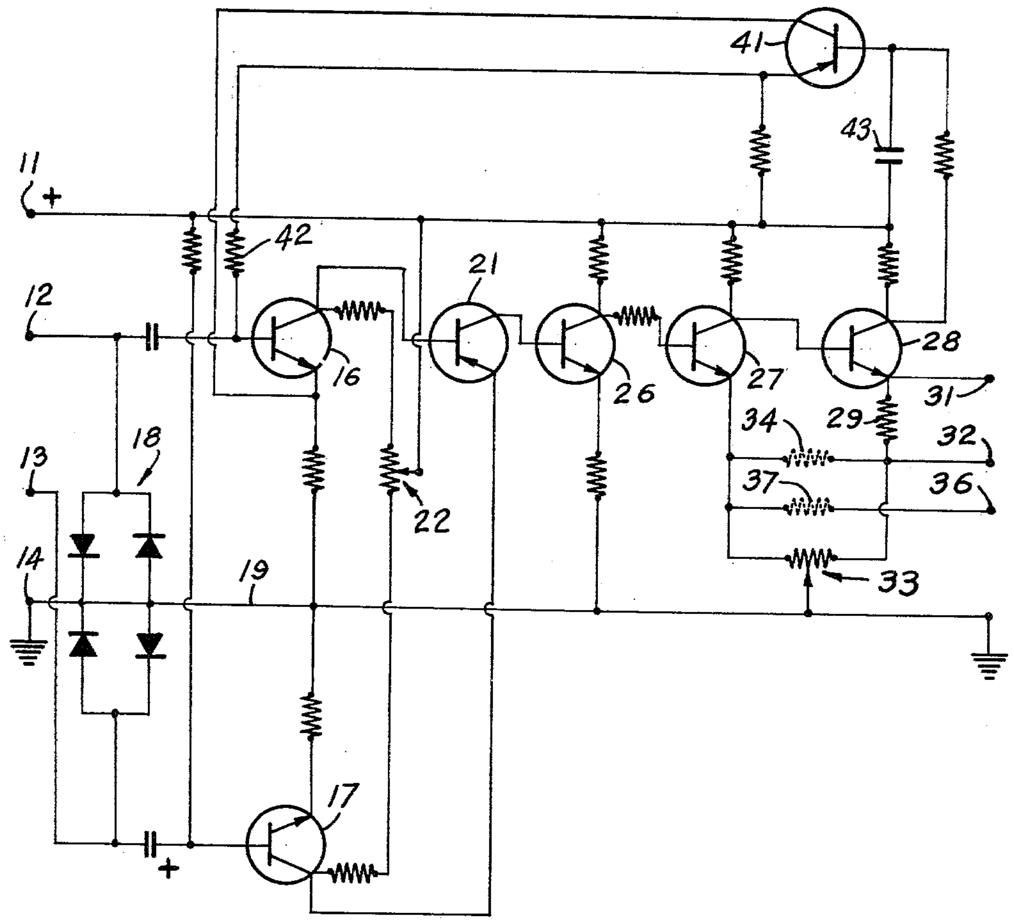
INVENTOR.
JOSEPH R. SMITH JR.
BY G. D. O'Brien
Donald C Keavency
ATTORNEYS United States Patent Office 3,196,362
Patented July 20, 1965

3,196,362
TEMPERATURE COMPENSATED SOLID STATE DIFFERENTIAL AMPLIFIER

Joseph R. Smith, Jr., Milpitas, Calif., assignor to the United States of America as represented by the Administrator of the National Aeronautics and Space Administration
Filed Jan. 4, 1962, Ser. No. 164,428
2 Claims. (Cl. 330—14)
(Granted under Title 35, U.S. Code (1952), sec. 266)

The invention described herein may be manufactured and used by or for the Government of the United States of America for governmental purposes without the payment of any royalties thereon or therefor.

The present invention relates to a differential amplifier having features and capabilities particularly adapting it to utilization in circuitry associated with biomedical equipment such as an electrocardiograph.

In the field of medical instrumentation it is necessary to amplify relatively low-level signals in the presence of substantial and variable noise signals, while at the same time minimizing the size and complexity of the amplification means. One example of the applicability of the present invention lies in the amplification of signals received from electrodes attached to the body of a person for the purpose of supplying an input to an electrocardiograph. The above-noted requirements are of particular importance under the conditions wherein the identified person may be confined in a limited space and subjected to substantial stresses as might occur in supersonic flight.

In the measurement of cardiovascular functions by an electrocardiograph, electrodes may be secured at appropriate points on the body of a person by suitable adhesives, and the amplifier hereinafter described may be employed to amplify output voltage from such electrodes for actuation of an electrocardiograph. In this type of application, it is necessary that the input voltages to the amplifier be maintained quite low in order not to endanger the person upon which the electrodes are secured. Because of these low input voltages, the elimination of noise pickup on the body of the person becomes a serious problem and the present invention is particularly directed to the provision of a very high ratio common mode rejection and adjustable cancellation for unbalanced noise signals. This adjustable cancellation is important inasmuch as noise pickup from the body of a person is not always balanced even though the input lines to the amplifier are themselves balanced. The present invention furthermore operates upon a very low voltage supply to maximize safety and includes an automatic temperature compensation which is particularly important for applications wherein widely varying ambient temperatures are encountered.

It is the object to the present invention to provide an improved differential amplifier circuit having adjustable noise cancellation for the elimination of unbalanced noise signals.

It is another object of the present invention to provide an improved differential amplifier having an automatic temperature compensation network therein.

It is a further object of the present invention to provide a transistorized differential amplifier circuit having both low and high frequency response.

It is yet another object of the present invention to provide an improved differential amplifier having a very high ratio of common mode rejection of input noise signals.

There is illustrated in the accompanying drawing a circuit diagram of a preferred embodiment of the present invention.

Considering now the invention hereof in some detail and referring to the attached drawing, there will be seen to be illustrated input terminals 11, 12, 13, and 14, the latter of which being grounded. Terminal 11 is adapted to be connected to a power supply, not shown, which produces a direct current voltage of a relatively low order, as for example, four volts. Terminals 12 and 13 may be connected by balanced leads to separate electrodes attached to the body of a person and these two terminals are coupled through separate capacitors to the bases of separate transistors 16 and 17, respectively. A diode network 18 is connected between each of the input terminals 12 and 13 and ground, as indicated, in order to prevent saturation of the input transistors 16 and 17 from overly large noise signals possibly appearing in the input of the circuit. These diodes form low resistance paths to a common ground lead 19 for large input signals.

The double-ended input of the amplifier circuit hereof is afforded by the transistors 16 and 17 which, as illustrated, have the emitters thereof connected through like resistors to the ground line 19 and the collectors thereof connected to the base and emitter of a second transistor 21. With this circuitry it will be seen that like input signals impressed upon the transistors 16 and 17 will produce corresponding voltage variations at the collectors thereof, so that no voltage change occurs between the base and emitters of the transistor 21. This arrangement provides for a conversion from a double-ended input to a single-ended output and at the same time provides for a common mode rejection, wherein like voltage variations of the input terminals 12 and 13 with respect to ground do not produce signals passing through the amplifier to the output thereof. These common mode signals are unwanted signals in this circuitry, and it is desired to amplify the voltage variations occurring between the terminals 12 and 13 rather than between these terminals and ground.

Adjustable noise cancellation is afforded in the circuit of the present invention by the potentiometer 22 having a resistor coupled to the collectors of the input transistors 16 and 17 and a variable contact connected to the power supply line of terminal 11. By varying the position of the movable contact of this potentiometer, it will be seen to be possible to increase the gain of one amplifier transistor while reducing the gain of the other and thus to balance the circuit under conditions wherein the noise level at the two input terminals 12 and 13 are not equal. This arrangement allows the signal gain to be kept constant while providing for equalizing the noise gain.

The second transistor 21 serves to convert the double-ended input system to a single-ended system, and while this circuitry does not afford any amplification it does provide for input into a wide load range, in that the transistor 21 in effect operates as a current source producing at the collector thereof a current proportional to the signal from the bridge formed by the transistors 16 and 17. Following the transistor 21 in the circuit is a direct coupled amplifier including successive transistors 26, 27, and 28. The first of these transistors has the base thereof directly coupled to the collector of the transistor 21, and appropriate resistors couple the collector of this transistor 26 to the power supply line and the emitter to the ground line. A resistor couples the output signal from the transistor 26 to the base of the transistor 27 and a direct connection is provided between the collector of the transistor 27 and the base of the final transistor 28. Power is supplied to these transistors 27 and 28 by a resistive coupling of the collectors thereof to the power supply line.

An emitter-follower connection is employed to supply the output signal from the amplifier hereof, and in this respect a resistor 29 is connected to the emitter of the last transistor 28, with output terminals 31 and 32 being connected across this resistor. Ground connection of the transistors 27 and 28 is afforded by a potentiometer 33 having the movable contact thereof connected to the ground line 19 and the resistor thereof connected from the emitter of the transistor 27 to the resistor 29 in the emitter circuit of the final transistor 28. An additional resistor 34 may be connected in parallel with the resistor of the potentiometer 33 and an additional output terminal 36 may be coupled through a resistor 37 to the emitter of the transistor 27

The direct coupled amplifier described immediately above may operate in a relatively conventional manner to amplify signals received from the transistor 21, and appropriate connections to the output terminals of the circuit hereof provide a choice of output voltages for energizing equipment such as medical instrumentation which may be attached hereto. Unwanted signals in the form of various types of noise signals are canceled out in the circuit hereof so that they do not appear in the output of the amplifier. Voltage differences existing between ground and the two input terminals 12 and 13 are balanced out in the input circuitry so as not to appear as driving signals to the transistor 21, while adjustable noise level cancellation is afforded by the potentiometer 22 so that this possible source of error signal is prevented from passing to the output of the circuit.

In addition to the foregoing, the amplifier hereof includes circuitry for automatic temperature compensation. This circuitry is illustrated in the accompanying drawings as including a transistor 41 having the base thereof coupled through a resistor to the collector of the output transistor 28. The emitter of this transistor 41 is coupled through a resistor to the power supply line and also through a resistor 42 to the base of the input transistor 16. The collector of the transistor 41 is directly coupled to the emitter of the input transistor 16 so that there is formed a feedback circuit from the output transistor 28 to the input transistor 16. A capacitor 43 is connected from the base of the feedback transistor 41 to the power supply line for bypassing alternating current signals so that only direct current signals are fed back to the input of the amplifier. Negative feedback is herein employed, so that the direct current signals returned to the input transistor 16 are of opposite polarity to the direct current output variations of the amplifier, and consequently, serve to cancel these variations. Alternating current signals at the output of the amplifier are not fed back, and consequently, these desired amplified signals appear in the output and no negative feedback is provided for cancellation thereof. In this manner the direct current voltage level and the alternating current gain of the amplifier are held constant. This then provides for a temperature compensation to prevent direct current drift of the circuit with variations in temperature of the circuit components which change the operating parameters of these components.

The above-described circuit of the present invention will be seen to provide for the amplification of small alternating current signals to the exclusion of large or small input noise signals while maintaining a constant alternating current gain and providing temperature stabilization of the circuitry. Variations in voltages appearing at the input terminals 12 and 13 produce a voltage change between the base and emitter of the second transistor 21 to thereby provide input signals to the direct coupled amplifier feeding the output terminals of the circuit. Like variations of the input signals with respect to ground, produce voltage variations at the collectors of the input transistors 16 and 17 which are equal, and consequently, do not establish any voltage change between the base and emitter of the subsequent transistor 21 so that same do not produce signals in the direct coupled amplifier. The potentiometer 22 provides for increasing the gain of one of the input transistors while decreasing the gain of the other to maintain a constant signal gain while equalizing the noise gain. This is particularly important in biomedical applications, wherein the noise level at one of the input terminals may differ from that of the other. A further advantage gained from the circuitry including the potentiometer 22 is the availabality of matching the outputs of the input transistors without the necessity of providing actual matched transistors. The adjustable gain feature hereof thus allows the utilization of conventionally manufactured transistors without requiring that these be individually matched to balance same under operating conditions. Balancing of the output "zero" level is not effected by balancing of the noise voltages with the potentiometer 22, inasmuch as the temperature compensating network is included herein as a feedback circuit.

An actual amplifier circuit constructed as described above and illustrated in the accompanying drawing has been found to have a common mode rejection of approximately ten thousand to one, referenced to the input. This amplifier employing a four volt direct current supply required eight milliwatts of power to produce a one volt peak-to-peak output with a 3.6 millivolt input signal. The circuit exhibited a high input impedance and a very good low frequency response which was down only three decibels at 0.5 cycle per second and a similar frequency response at 70,000 cycles per second. Both high and low output impedances are available, and this circuit produced an output of one volt peak-to-peak feeding into a 10,000 ohm load and/or 300 microamperes feeding into a 33 ohm load for a 3 millivolt input.

Although the present invention has been described above with reference to a single preferred embodiment thereof, it will be apparent to those skilled in the art that various modifications and alternatives may be made without departing from the true spirit of the invention. It is thus not intended to limit the invention by the terms of the description or details of the drawing, but instead reference is made to the following claims for a precise definition of the actual scope of the invention.

What is claimed is:

1. An alternating current amplifier comprising a pair of input transistors having the bases thereof separately coupled to a pair of input terminals and the emitters thereof coupled to a common terminal for input signals, a potentiometer connected between collectors of said input transistors and to power supply means for adjustable cancellation of unwanted input signals, a conversion transistor, means coupling the collectors of said input transistors between the base and emitter of said conversion transistor whereby the output of said latter transistor is proportional only to variations in voltage between said input terminals, at least amplifying transistor having the base thereof coupled to the collector of said conversion transistor and producing an amplified output across a resistor connected to the emitter thereof, and a negative feedback circuit including a transistor having a base coupled to the collector of said amplifier transistor and the collector and emitter connected across the base and emitter of one of said input transistors with a bypass capacitor in the base circuit of said feedback transistor, whereby only direct current amplifier output signals are fed back to provide temperature stabilization of the circuit.

2. A biomedical amplifier comprising a pair of input terminals adapted to have impressed thereon voltages with respect to ground, a diode circuit between each of said input terminals and ground for bypassing large input voltages, first and second like transistors having the bases thereof coupled to separate input terminals and the emitters coupled to ground, a potentiometer coupled between collectors of said first and second transistors and to power supply means for varying the relative gains of said transistors, a third transistor having a base connected to a collector of the first of said transistors and an emitter connected to the collector of said second transistor for producing an output current proportional to voltage difference variations at said input terminals, a plurality of direct coupled transistors connected between the collector of said third transistor and output terminal for producing amplified alternating current output signals, and a direct current negative feedback system including a transistor coupled to the collector of the last of said direct coupled transistors with a capacitor bypassing alternating current signals thereto and connected in emitter-follower arrangement across the input of said first transistor.

References Cited by the Examiner

UNITED STATES PATENTS

| | | | |
|---|---|---|---|
| 2,954,530 | 9/60 | Haskell | 330—19 |
| 2,999,169 | 9/61 | Feiner | 330—28 X |

| | | | |
|---|---|---|---|
| 3,046,487 | 7/62 | Matzen et al. | 330—30 X |
| 3,077,566 | 2/63 | Vosteen | 330—19 X |
| 3,101,437 | 8/63 | Photinos | 330—14 X |

OTHER REFERENCES

Conrad "Differential Amplifier Null Detector," Electronics, vol. 23, February 1950, pages 96–97.

Flynn, M. J. "CTRL Latch," IBM Technical Disclosure Bulletin, vol. 1, No. 6, April 1959, page 20.

ROY LAKE, *Primary Examiner.*

JOHN KOMINSKI, *Examiner.*